C. W. CROGAN.
TAPELINE CASE STOP.
APPLICATION FILED DEC. 1, 1919.
1,434,528.
Patented Nov. 7, 1922.
Fig. 1.
Fig. 2.
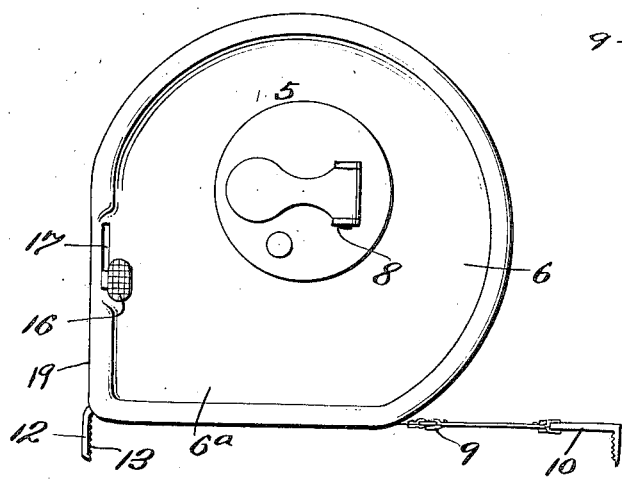
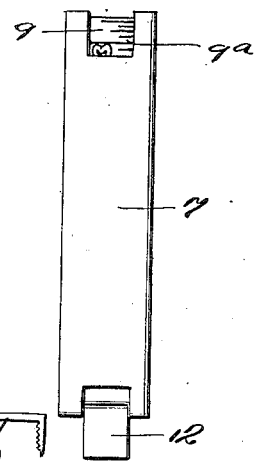
Fig. 3.
Fig. 4.
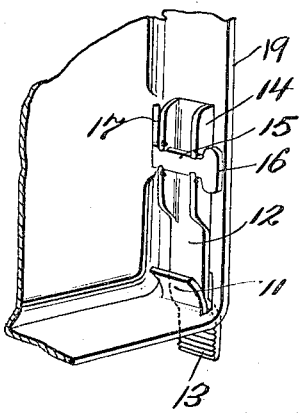
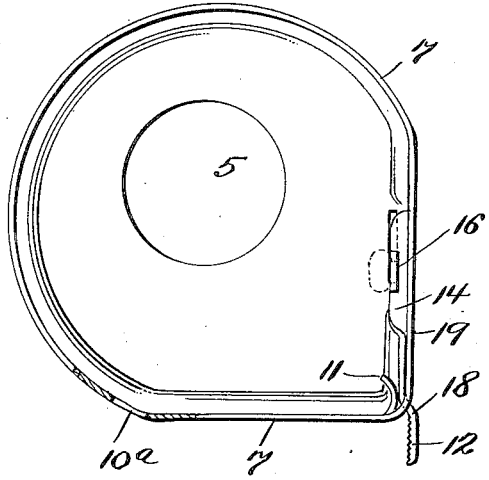
Inventor
C. W. Crogan,
By Geo. P. Kimmel
Attorney Patented Nov. 7, 1922.

1,434,528

UNITED STATES PATENT OFFICE.

CHARLES W. CROGAN, OF BANGOR, MAINE.

TAPELINE-CASE STOP.

Application filed December 1, 1919. Serial No. 341,608.

*To all whom it may concern:*

Be it known that I, CHARLES W. CROGAN, a citizen of the United States, residing at Bangor, in the county of Penobscot and State of Maine, have invented certain new and useful Improvements in Tapeline-Case Stops, of which the following is a specification.

This invention relates to improvements in tape lines and has for its primary object to apply a novel stop to a particular type of tape line casing whereby the latter may be held in accurate position upon a corner, shoulder or other prominent point, while the desired measurement is being made.

Another object resides in the provision of a novel construction and arrangement of the stop whereby the latter may be withdrawn within the tape line casing so as to be entirely concealed from view and which, when projected to operative position is moved laterally so as to occupy accurate measuring position with relation to the casing.

With these and other objects in view as will appear as the description proceeds the invention comprises the novel features of construction, combination of elements and arrangement of parts which will be more fully described in the following specification and set forth with particularity in the claims appended hereto.

Figure 1 represents a side elevation of the improved tape line casing and stop therefor, Figure 2 represents an edge elevation of the casing and stop.

Figure 3 represents a fragmentary perspective view of the interior of a portion of the case illustrating the specific structure of the stop, and, Figure 4 is an elevation of the interior of one of the parts of the casing, the other part being removed.

Referring to the drawing in detail, wherein similar reference numerals designate corresponding parts through the several views, the numeral 5 indicates the spaced opposed side walls of the tape line case which comprise the substantially semi-circular body portions 6 and the V-shaped projection 6ª formed integral therewith. One side wall of the case is provided with a marginal right angularly directed flange 7 conforming to the peculiar contour of the tape line case and provided at a point adjacent the juncture of the semi-circular and V-shaped portions with an opening through which the terminal of the flexible tape line 9 is extended. As usual, the inner terminal of the tape line is secured to a drum 8 rotatably supported in the housing or case and adapted to be rotated to wind the flexible tape line thereon. A terminal hook 10 is fastened to the tape line 9 and is adapted to cooperate with the novel type of tape line case stop to be hereinafter more fully described in obtaining accurate measurement of objects, and the curved portion of the case is provided with an opening 9ª exposing a portion of the tape line to view for convenience in determining distance between the terminal of the tape line and the case. The bight portion of the flange 7 at one corner of the case is provided with a substantially U-shaped slit and the material lying between the parallel portions of the slit is thrust inwardly to provide a guide 11. The tape line case stop designated generally by the numeral 12 is arranged internally of the case except at one terminal is adapted for projecting through the opening in the flange 7 formed by the slit therein. The stop 12 lies in facial abutment with that portion of the V-shaped portion of the flange 7 opposite that having the opening 10ª therein through which the flexible tape line projects and when the stop is projected to operative position it may be engaged over a corner or shoulder of an object to anchor the case in position thereon while the tape line is withdrawn from the case in order to obtain measurement of the object. In order to prevent accidental slipping of the terminal of the stop from the object, the object engaging face is preferably serrated as indicated at 13 to increase its gripping efficiency. The inner terminal of the stop is provided with laterally directed flanges 14 which are recessed to accommodate a transverse strip 15 adequately secured in position upon the stop by upsetting the material thereof to securely clamp the strip in position. The terminals of the strip are enlarged as indicated at 16 and extend through slots 17 formed in the opposed side walls of the tape line case whereby the sliding movement of the stop with relation to the case is guided and limited and for convenience in manipulation of the stop the outer surfaces of the terminal enlargements 16 are preferably roughened. Preliminary to assembling the portions or sections of the tape line case, the terminal enlargements 16 of the cross bar 15 are preferably moved into alignment with the medial portion thereof to facilitate insertion of said terminals through the slots 17 and subsequent to properly assembling the sections of the case the terminals 16 are turned inwardly so as to lie in contact with the outer surfaces of the side walls 5 and prevent loose movement and accidental displacement of the stop with relation thereto.

As will be understood, the slots 17 are of such length as to permit the stop 12 to be withdrawn to such position within the casing as to be entirely concealed, however, when it is desired to project the stop to operative position, such adjustment may be conveniently accomplished with slight pressure exerted upon the terminal enlargements 16, which latter constitute handles. Adjacent its outer terminal, the body portion of the stop 12 is offset as at 18 and the shoulder or prominent portion defined by offsetting the stop causes the latter to be projected laterally as it moves into engagement with the curved surface of the guide 11 thus moving the object engaging face 13 of the stop into alignment with the straight face 19 of the case.

In order to use the improved tape line in the usual manner, the adjustable stop 12 is withdrawn into the casing 5 and, assuming that it is desired to measure the distance along a beam from the terminal thereof to the face of a wall or other object, the hook 10 at the terminal of the flexible tape line is engaged with the terminal of the beam and the tape line case is moved thereon until the straight flat face 19 is engaged by the wall, the tape line, as will be understood, unwinding from the drum or spool 8 as the case is moved along. By referring to the scale marked on the tape line 9 exposed through the opening 9ª the measurement may be readily and accurately obtained. It being understood that the zero point of the scale is spaced a distance from the terminal hook 10 corresponding to the distance between the object engaging face of the stop 12 and the point in the opening 9ª at which the reading is made. However, if it is desired to retain the tape line case in a fixed position upon an object, the same is set upright, as suggested in Figure 1 and an adjustable stop 12 moved outwardly so as to embrace a shoulder or other prominent point, thus anchoring the case in position and permitting as much of the flexible tape line as is necessary to obtain the desired measurement to be withdrawn from the case. Owing to the fact that the object engaging face 13 of the stop is disposed in accurate alignment with the face 19 of the case, when the stop is fully projected, it is evident that as accurate a measurement may be obtained when using the adjustable stop 12 as in using the tape line in the usual manner.

What I claim is:

1. The combination with a tape line casing having a wall adapted for engagement with an object, of an object engaging stop carried by said wall of the casing, means for projecting said stop from said casing, and means for moving said stop from its initially projected position into full operative position.

2. The combination with a tape line casing having a straight wall adapted for engagement with an object, of an object engaging stop carried by the straight wall of the casing, means for projecting said stop from said casing, and means for moving said stop terminal from its initially projected position into full operative position.

3. The combination with a tape line casing having a flat object engaging face, of an adjustable stop member normally concealed within the casing adjacent the flat object engaging face thereof, means for projecting said stop from said casing, and means for moving said stop from its initially projected position into any desired adjusted operative position outwardly of said casing.

4. The combination with a tape line casing having a flat object engaging face, of a stop carried within the casing and having an offset object engaging terminal, closely overlying an outer portion of the flat face thereof, means for projecting the terminal of said stop from its normal position, and means for moving said stop terminal from its initially projected position to operative position with respect to the flat face of the casing.

5. The combination with a tape line casing having a flat object engaging face, of a stop adjustably mounted within the casing, an offset object engaging terminal formed at the free end of said stop, a guide member carried by the casing for effecting the initial projection of the offset terminal stop from the casing, and means for moving said offset terminal from its initially projected position to its full operative position.

6. The combination with a tape line casing having a slot opening through one wall thereof, of a stop member mounted within the casing and adapted to be projected through the said slot, an offset object engaging terminal formed at the free end of said stop member, a guide member carried by said casing for effecting the initial projection of the terminal end of said stop member from the said slot, and means for moving said stop terminal from its initially projected position to its full operative position.

7. The combination with a tape line casing having oppositely slotted side walls, of a stop member slidably mounted in the casing, means within the casing for guiding the active terminal of said stop member to and from its normal position, and a transversely extending member having its opposite ends projecting through the slots of the side walls of the casing for manipulating said stop member.

8. In a device of the class described, a casing formed to provide angularly disposed flat wall portions and a slot opening into the casing through one of the flat wall portions immediately adjacent its point of connection with the other of the same, a stop member slidably mounted within the casing and having an offset terminal extending through the said slot and normally disposed flush in the plane of said flat wall portions, means for initially projecting the said offset terminal from its normally inoperative position, and means for moving said offset terminal to and from full operative position.

9. In a device of the class described, a casing formed to provide angularly disposed flat wall portions one curving into the other at their connected ends, one of said wall portions having a slotted opening therein immediately adjacent its point of connection with the other of the same, of a stop member slidably mounted within the casing and movable through the said slotted opening, the free end of said stop member being outwardly offset to normally lie flush in the plane of the flat wall portions, means within the casing and underlying the said slot for effecting the initial projecting movement of the offset terminal of said stop member, and means for moving said offset terminal to and from full operative position.

10. In a device of the class described, a casing formed to provide angularly disposed flat wall portions one curving into the other at their connected ends, one of said wall portions having a slotted opening therein immediately adjacent its point of connection with the other of the same, of a stop member slidably mounted within the casing and movable through the said slotted opening, the free end of said stop member being outwardly offset to normally lie flush in the plane of the flat wall portions, an inwardly curved guide member flush in the planes of the flat wall portions, an inwardly curved guide member underlying the said slotted opening for effecting the initial projecting movement of the offset terminal of said stop member, and means for moving said offset terminal to and from the full operative position.

In testimony whereof, I affix my signature hereto.

CHARLES W. CROGAN.